US 6,855,671 B2

United States Patent
Norfleet et al.

(10) Patent No.: US 6,855,671 B2
(45) Date of Patent: Feb. 15, 2005

(54) WATER BASED FLUIDS COMPRISING MULTIVALENT SALTS AND LOW MOLECULAR WEIGHT, LOW CHARGE CATIONIC POLYACRYLAMIDE COPOLYMERS

(75) Inventors: James E. Norfleet, Magnolia, TX (US); Michael A. Jarrett, Houston, TX (US); Patricia A. Potts, Houston, TX (US); Tao Xiang, Houston, TX (US); Frank E. Evans, The Woodland, TX (US)

(73) Assignee: Baker Hughes Incorporated, Houston, TX (US)

( * ) Notice: Subject to any disclaimer, the term of this patent is extended or adjusted under 35 U.S.C. 154(b) by 73 days.

(21) Appl. No.: 10/095,020

(22) Filed: Mar. 11, 2002

(65) Prior Publication Data

US 2003/0069141 A1 Apr. 10, 2003

Related U.S. Application Data

(63) Continuation-in-part of application No. 09/411,346, filed on Oct. 1, 1999, now Pat. No. 6,355,600.

(51) Int. Cl.$^7$ ................................................ C09K 7/02
(52) U.S. Cl. ...................... 507/120; 507/119; 507/123; 507/124; 507/125; 507/145
(58) Field of Search ................................ 507/120, 119, 507/123, 124, 125, 145, 225

(56) References Cited

U.S. PATENT DOCUMENTS

| | | | |
|---|---|---|---|
| 3,210,310 A | | 10/1965 | Holbert et al. |
| 3,562,226 A | * | 2/1971 | Gayley ........................ 507/225 |
| 4,366,074 A | | 12/1982 | McLaughlin et al. |
| 4,425,241 A | | 1/1984 | Swanson |
| 4,532,052 A | | 7/1985 | Weaver et al. |
| 4,540,496 A | | 9/1985 | Peiffer et al. |
| 4,547,299 A | | 10/1985 | Lucas |
| 4,552,670 A | | 11/1985 | Lipowski et al. |
| 4,554,081 A | * | 11/1985 | Borchardt et al. ........... 507/121 |
| 4,600,515 A | * | 7/1986 | Gleason et al. ............. 507/120 |
| 4,626,363 A | * | 12/1986 | Gleason et al. ............. 507/118 |
| 4,649,183 A | | 3/1987 | McCormick et al. |
| 4,812,242 A | | 3/1989 | James et al. |
| 4,861,499 A | | 8/1989 | Neff et al. |
| 4,892,916 A | | 1/1990 | Hawe et al. |
| 5,116,421 A | | 5/1992 | Ganguli |
| 5,134,118 A | | 7/1992 | Patel et al. |
| 5,570,749 A | | 11/1996 | Reed |
| 5,607,902 A | | 3/1997 | Smith et al. |
| 5,663,123 A | | 9/1997 | Goodhue, Jr. et al. |
| 5,735,349 A | | 4/1998 | Dawson et al. |
| 5,762,141 A | | 6/1998 | Hutchins et al. |
| 5,789,349 A | | 8/1998 | Patel |
| 6,355,600 B1 | * | 3/2002 | Norfleet et al. ............. 507/120 |
| 6,403,537 B1 | * | 6/2002 | Chesser et al. ............. 507/120 |
| 2004/0072695 A1 | * | 4/2004 | Chesser et al. ............. 507/100 |

FOREIGN PATENT DOCUMENTS

| | | |
|---|---|---|
| EP | 0544377 A1 | 6/1993 |
| EP | 0728826 A1 | 8/1996 |
| GB | 2221940 A * | 2/1990 |

* cited by examiner

*Primary Examiner*—Philip C. Tucker
(74) *Attorney, Agent, or Firm*—The Morris Law Firm, P.C.

(57) ABSTRACT

A drilling system fluid and method of using same. The drilling system fluid comprises water as a continuous phase, an amount of a multivalent metal, and a quantity of a water soluble polyacrylamide copolymer having a charge density of at least about 1%. In a preferred embodiment, the fluid also comprises a second amount of a monovalent salt effective to increase gas hydrate suppression and decrease density when compared to a fluid consisting essentially of only a divalent salt in the absence of the monovalent salt.

95 Claims, No Drawings

WATER BASED FLUIDS COMPRISING MULTIVALENT SALTS AND LOW MOLECULAR WEIGHT, LOW CHARGE CATIONIC POLYACRYLAMIDE COPOLYMERS

The present application is a continuation-in-part of patent application Ser. No. 09/411,346, filed Oct. 1, 1999, to be issued as U.S. Pat. No. 6,355,600 on Mar. 12, 2002.

FIELD OF THE INVENTION

The present invention relates to aqueous base fluids, including drilling system fluids and environmental servicing fluids, such as water treatment fluids. The water-base fluids comprise a multivalent salt, preferably a divalent salt, and comprise a polyacrylamide copolymer having a relatively low cationic charge density of at least about 1%.

BACKGROUND OF THE INVENTION

Fluids used during drilling operations include "drilling," "drill-in," and "completion" fluids. A "drill-in" fluid is pumped through the drill pipe while drilling through the "payzone," or the zone believed to hold recoverable oil or gas. A "drilling fluid" is used to drill a borehole through the earth to reach the payzone. Typically a drilling mud is circulated down through the drill pipe, out the drill bit, and back up to the surface through the annulus between the drill pipe and the borehole wall. The drilling fluid has a number of purposes, including cooling and lubricating the bit, carrying the cuttings from the hole to the surface, and exerting a hydrostatic pressure against the borehole wall to prevent the flow of fluids from the surrounding formation into the borehole. A "completion fluid" is used to protect the "payzone" during the completion phase of the well.

Fluids in which water is the continuous phase provide for a fast drilling rate, and are ecologically favored over fluids in which oil is the continuous phase. Unfortunately, the walls of a wellbore frequently are composed at least in part of shale, and when exposed to water, many shales swell, slough, or spall to the extent that they may even prevent further operation of the wellbore. Shale also may slough off during gravel transport in open-hole completion, mix with the gravel, and reduce the productivity of the well by choking off the permeability of the gravel pack. The sloughing also may cause screen blinding.

Brines have long been used in the formulation of drilling fluids to take advantage of their density and their inhibitive characteristics. Clay chemistry has shown us that cationic base exchange with the negatively charged clay minerals commonly found in shale formations, limits their ability to hydrate, soften, and swell, thereby rendering them more stable in the presence of water based fluids.

Monovalent salts, such as NaCl or KCl, have long been used as make up water for drilling fluids. In the past, NaCl or KCl have provided a limited inhibitive environment for drilling hydratable shales in many areas. In offshore drilling, seawater—a complex mixture of various salts which is readily available—has frequently been used in formulating drilling mud.

Today, technological advances in the design of drilling equipment has resulted in increased penetration rates for better drilling economics. The performance of the monovalent salt systems has not been able to maintain pace with new advances in drilling technology. The need for improved drilling mud systems saw the application of oil mud systems and development of synthetic systems to meet these challenges. However, increasing environmental regulation has limited the application of these systems.

Multivalent salts, preferably divalent salts, are known to provide an added inhibitive benefit for drilling water sensitive shales. Multivalent salts are capable of developing a strong bond with and between active clay platelets in these shales, thereby further limiting the volume of hydration water that can become a part of the clay, causing it to become soft, pliable, and sticky, resulting in problems with mechanical drilling equipment and drilling fluid control. One of the most available and economical multivalent salt systems is $CaCl_2$. $CaCl_2$ systems have been around for many years, and the inhibitive characteristics of the calcium ion are well known.

Water-soluble polymers are used to thicken water-base fluids, and in part to synergistically stabilize shale. In drilling fluids, the water-soluble polymers provide the viscosity necessary to lift drilled solids from the wellbore, and tend to improve drilling rates.

Unfortunately, drilling fluids which have shown promise in increasing the rate of penetration through shales also have tended to increase screen blinding, which can lead to huge losses of mud, with loss of rig time and high fluid costs. Water base fluids are needed which can achieve a high rate of penetration without screen blinding.

BRIEF SUMMARY OF APPLICATION

The present application provides a water base fluid comprising:
water as a continuous phase;
a first amount of a multivalent metal salt; and,
a quantity of water soluble polyacrylamide copolymer having a cationic charge density of at least about 1% and having the following general structure:

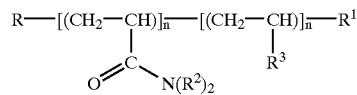

wherein
R and $R^1$ independently are selected from the group consisting of hydrogen, acrylamide groups, acrylate groups, polyacrylamide groups, polyacrylate groups, and copolymers thereof;
$R^2$ independently is selected from the group consisting of moieties effective to maintain said water solubility under use conditions;
$R^3$ is selected from cationic groups comprising a charge in the range of from about +1 to about +4; and
n independently is at least 1.

DETAILED DESCRIPTION OF THE INVENTION

The present invention involves "water base fluids," defined broadly herein as drilling fluids, drill-in fluids, completion fluids, well-servicing fluids, gravel packing fluids, and environmental servicing fluids, such as water treatment fluids. Where the water base fluid is a drilling system fluid, that fluid is defined to include drilling fluids, drill-in fluids, completion fluids, well-servicing fluids, and gravel packing fluids. The water-base drilling system fluids have effective rheology and fluid loss control properties and advantageously stabilize shale encountered during drilling, servicing or gravel packing.

The water base fluids generally comprise a combination of one or more suitable multivalent salt(s), preferably divalent salt(s), and a relatively low charge cationic, low molecular weight polyacrylamide copolymer. In a preferred embodiment, the water base fluid also comprises a suitable monovalent salt. In an even more preferred embodiment for use in drilling system fluids, the multivalent salt is calcium chloride and the monovalent salt is sodium chloride.

When used as a drilling system fluid, the water-base fluids provide a rate of penetration that approaches synthetic oil-based systems, and also provide good shale encapsulating properties for control of gumbo shale without substantial screen blinding. For purposes of the present application, the term "substantial screen blinding" is defined as the formation of a mat of undissolved or dispersed polymer on the shaker screen, which blocks passage of the hole fluid through the shaker screen, causing the hole fluid to overflow the shaker screen.

Preferred drilling system fluids are brines comprising a mixture of salts comprising about 5 wt % to about 20 wt %, preferably about 15 wt % of a multivalent salt, preferably a divalent salt, most preferably calcium chloride, and about 0 lb/bbl to about 70 lb/bbl, preferably about 40 lb/bbl to about 70 lb/bbl, most preferably 50 lb/bbl of a monovalent salt, preferably sodium chloride. The fluids can contain any suitable multivalent salts. Suitable multivalent salts include, but are not necessarily limited to salts based on multivalent metals. Examples of suitable multivalent metals include, but are not necessarily limited to calcium, magnesium, zinc, and aluminum. Suitable monovalent salts include but are not necessarily limited to those based on metals such as sodium, potassium, cesium, and lithium. The salt may contain substantially any anions, with preferred anions including, but not necessarily limited to chlorides, bromides, formates, propionates, sulfates, acetates, carbonates, and nitrates. A preferred anion is chlorine. Preferred brines comprise calcium chloride. Sodium chloride is typically added to the drilling system fluid after the calcium chloride brine.

The water-base fluids contain "water-soluble polymers," defined as polymers that are capable of viscosifying a drilling system fluid and/or providing filtration control for a drilling system fluid. Preferred viscosifiers and filtration control agents are XAN-PLEX™ D, BIO-PAQ™ and/or BIOLOSE™, all of which are commercially available from Baker Hughes INTEQ.

The drilling system fluids also contain "polyacrylamide copolymers" to provide shale inhibition, among other things. The term "polyacrylamide copolymers" is defined herein to refer to cationic polyacrylamide copolymers having a relatively low molecular weight and a relatively low charge. The term "low molecular weight" is defined to mean copolymer units having from about 500,000 to 4 million mole weight, preferably from about 800,000 to about 1 million mole weight. The term "low charge" is defined to mean at least 1 mol % of a cationic monomer charge, preferably not more than 15 mol. % of the cationic monomer charge, more preferably about 5 mol % to about 10 mol % cationic monomer charge. The cationic monomer charge may be from about 1 to about 4.

Without limiting the present invention to a particular mechanism of action, it is believed that cations in the polyacrylamide copolymer adsorb onto the negatively charged surface of the shale, forming a gelatinous protective layer which inhibits degradation of the shale. The acceptable mol. % of cationic monomer charge will vary depending upon the solids content of the fluid. The lower the solids content, the higher the acceptable cationic monomer charge. For example, clear brines function with a relatively high cationic monomer charge.

Suitable polyacrylamide copolymers have the following general structure:

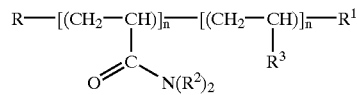

wherein

R and $R^1$ independently are selected from the group consisting of hydrogen, acrylamide groups, acrylate groups, polyacrylamide groups, and polyacrylate groups, and copolymers thereof;

$R^2$ independently is selected from the group consisting of moieties effective to maintain said water solubility under use conditions;

$R^3$ is selected from cationic groups comprising a charge of from about +1 to about +4; and n is at least 1.

Preferably, the cationic charge density is from about 1% to about 15%, more preferably from about 5% to about 10%. The $R^2$ groups maintain water solubility of the polyacrylamide copolymer by protecting the polyacrylamide copolymer from precipitating out of the water base fluid in response to salinity, increased temperature, and/or pH changes in the fluid.

In a preferred embodiment, $R^2$ independently is selected from the group consisting of hydrogen; cyclic, linear, and branched alkyl and heteroalkyl groups having from about 1 to about 6 carbon atoms wherein said heteroalkyl groups o comprise one or more heteroatoms selected from the group consisting of nitrogen and oxygen; cyclic, linear, and branched alkenyl and heteroalkenyl groups having from about 1 to about 6 carbon atoms and resonance hybrids thereof; carboxylic acid groups and salts, esters, and amides thereof comprising cyclic, linear, and branched alkyl groups, heteroalkyl groups, alkenyl groups, and heteroalkenyl groups having from about 1 to about 6 carbon atoms wherein said hetero groups comprise one or more heteroatoms selected from the group consisting of nitrogen and oxygen; aromatic groups; alkanols and alkenols having from about 1 to about 6 carbon atoms; alkanolamides and alkenol amides having from about 1 to about 6 carbon atoms; and combinations thereof.

More preferably, $R^2$ independently is selected from the group consisting of hydrogen, alkenyl pyrrolidones; alkenols; piperazines; styrenes; cyclic, linear, and branched alkyl, alkenyl, heteroalkyl, and heteroalkenyl groups having from about 1 to about 6 carbon atoms, wherein said heteroalkyl or heteroalkenyl groups comprise one or more heteroatom selected from the group consisting of nitrogen and oxygen; alkoxylated alkenyl groups having from about 1 to about 6 carbon atoms; acrylonitriles; acrylate groups; methacrylate groups; alkanolamides having from about 1 to about 6 carbon atoms; and alkenyl amides having from about 1 to about 6 carbon atoms.

Even more preferably, $R^2$ is selected from the group consisting of hydrogen, vinyl pyrrolidones; vinyl alcohols; piperazines; aminoalkyl piperazines comprising an alkyl group having from about 1 to about 6 carbon atoms; linear, branched and cyclic alkyl, alkenyl, heteroalkyl and heteroalkenyl groups having from about 1 to about 6 carbon atoms, wherein said heteroalkyl or heteroalkenyl groups comprise one or more heteroatom selected from the group consisting of nitrogen and oxygen; aromatic groups comprising an alkenyl substitutent having from about 1 to about 6 carbon atoms; alkoxylated alkyl groups and alkenyl groups having from about 1 to about 6 carbon atoms; acrylonitrile groups; acrylate and methacrylate groups; alkanolamides and alkenolamides having from about 1 to about 6 carbon atoms.

Most preferably, $R^2$ is selected from the group consisting of hydrogen; vinyl pyrrolidone; vinyl alcohol; piperazine; aminoethyl piperazine; styrene; alkyl groups and alkenyl groups having from about 1 to about 6 carbon atoms; trimethyl aminoethyl groups; alkoxylated alkyl groups and alkenyl groups having from about 1 to about 6 carbon atoms; alkenyl alcohols having from about 1 to about 6 carbon atoms; piperazines; styrene; alkyl groups having from about 1 to about 6 carbon atoms; alkoxylated alkyl groups and alkenyl groups having from about 1 to about 6 carbon atoms; acrylonitrile groups; acrylate and methacrylate groups; alkanolamides having from about 1 to about 6 carbon atoms; and vinyl amide.

Suitable $R^3$ groups are selected from the group consisting of ester groups, amide groups, and other groups suitable as $R^2$ groups, as described above. Preferred $R^3$ groups are selected from the group consisting of ester groups; hydrogen; cyclic, linear, and branched alkyl and heteroalkyl groups having from about 1 to about 6 carbon atoms wherein said heteroalkyl groups comprise one or more heteroatoms selected from the group consisting of nitrogen and oxygen; cyclic, linear, and branched alkenyl and heteroalkenyl groups having from about 1 to about 6 carbon atoms and resonance hybrids thereof; carboxylic acid groups and salts, esters, and amides thereof comprising cyclic, linear, and branched alkyl groups, heteroalkyl groups, alkenyl groups, and heteroalkenyl groups having from about 1 to about 6 carbon atoms wherein said hetero groups comprise one or more heteroatoms selected from the group consisting of nitrogen and oxygen; aromatic groups; alkanols and alkenols having from about 1 to about 6 carbon atoms; alkanolamides and alkenol amides having from about 1 to about 6 carbon atoms; and combinations thereof.

More preferably, $R^3$ is selected from the group consisting of ester groups; alkenyl pyrrolidones; alkenols; piperazines; styrenes; cyclic, linear, and branched alkyl, alkenyl, heteroalkyl, and heteroalkenyl groups having from about 1 to about 6 carbon atoms, wherein said heteroalkyl or heteroalkenyl groups comprise one or more heteroatom selected from the group consisting of nitrogen and oxygen; alkoxylated alkenyl groups having from about 1 to about 6 carbon atoms; acrylonitriles; acrylate groups; methacrylate groups; alkanolamides having from about 1 to about 6 carbon atoms; and alkenyl amides having from about 1 to about 6 carbon atoms.

Even more preferably, $R^3$ is selected from the group consisting of ester groups, vinyl pyrrolidones; vinyl alcohols; piperazines; aminoalkyl piperazines comprising an alkyl group having from about 1 to about 6 carbon atoms; linear, branched and cyclic alkyl, alkenyl, heteroalkyl and heteroalkenyl groups having from about 1 to about 6 carbon atoms, wherein said heteroalkyl or heteroalkenyl groups comprise one or more heteroatom selected from the group consisting of nitrogen and oxygen; aromatic groups comprising an alkenyl substitutent having from about 1 to about 6 carbon atoms; alkoxylated alkyl groups and alkenyl groups having from about 1 to about 6 carbon atoms; acrylonitrile groups; acrylate and methacrylate groups; alkanolamides and alkenolamides having from about 1 to about 6 carbon atoms.

Most preferably, $R^3$ is selected from the group consisting of ester groups; vinyl pyrrolidone; vinyl alcohol; piperazine; aminoethyl piperazine; styrene; alkyl groups and alkenyl groups having from about 1 to about 6 carbon atoms; trimethyl aminoethyl groups; alkoxylated alkyl groups and alkenyl groups having from about 1 to about 6 carbon atoms; alkenyl alcohols having from about 1 to about 6 carbon atoms; piperazines; styrene; alkyl groups having from about 1 to about 6 carbon atoms; alkoxylated alkyl groups and alkenyl groups having from about 1 to about 6 carbon atoms; acrylonitrile groups; acrylate and methacrylate groups; alkanolamides having from about 1 to about 6 carbon atoms; and vinyl amide.

Preferably, at least some $R^3$ groups have the following general structure:

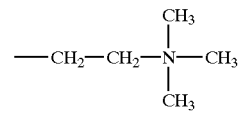

Suitable polyacrylamide copolymers are commercially available from a number of sources, and include but are not necessarily limited to HYPERDRILL CP-904L™, available from Hychem, Inc., Tampa, Fla., and SUPERFLOC™, available from Cytec Industries, West Patterson, N.J. A preferred polyacrylamide copolymer is DFE-243, which comprises partially hydrolyzed polyacrylamide (PHPA) and trimethylaminoethyl acrylate, which has about a 800,000 to 1 million molecular weight and about a 5% to about a 10% cationic charge density. DFE-243 is commercially available from Baker Hughes INTEQ.

The fluid contains a sufficient amount of the polyacrylamide copolymer to achieve the desired results. In order to achieve shale stabilization, the fluid preferably contains from about 0.05 wt % to about 0.5 wt % of the polyacrylamide copolymer, more preferably at least about 0.08 wt %, most preferably at least about 0.3 wt %, of the polyacrylamide copolymer.

Bridging or weighting agents preferably are added to bridge the pores in the formation. Suitable bridging or weighting agents include, but are not necessarily limited to ground marble or calcium carbonate particles, such as MIL-CARB, available from Baker Hughes INTEQ. Preferred calcium carbonate particles have a mean particle size of about 30 microns. Calcium carbonate has the advantage that it is acid soluble, and therefore can be removed from the formation by acid flushing. If calcium carbonate is used as the bridging agent, then from about 10 to about 50 pounds should be used per barrel of brine.

Preferred polyacrylamide copolymer containing drilling system fluids are "non-toxic." As used herein, the term "non-toxic" is defined to mean that a material meets the applicable EPA requirements for discharge into U.S. waters. Currently, a drilling system fluid must have an $LC_{50}$ (lethal concentration where 50% of the organisms are killed) of 30,000 parts per million (ppm) suspended particulate phase (SPP) or higher to meet the EPA standards. The mysid shrimp toxicity test for a drilling system fluid according to the present invention containing 1.0–1.25 lb/bbl DICAP™ resulted in an $LC_{50}$ of 120,000 ppm of the suspended particulate phase (SPP)—4 times the minimum EPA standard for discharge into coastal waters. The toxicity tests for the 0.1–1.5 lb/bbl DFE-243 resulted in an $LC_{50}$ of 150,000–300,000 ppm of the SPP. Alternative embodiments described herein are expected to exhibit similar toxicity results.

In order to prepare the foregoing drilling system fluids, fresh water is placed in a mixing hopper and the following are added: the viscosifying polymer (preferably XAN-PLEX™ D, available from Baker Hughes, INTEQ), and the filtration control polymer (preferably BIO-PAQ™ and/or BIOLOSE™, also available from Baker Hughes INTEQ). The mixture is agitated well before adding the calcium chloride brine and the sodium chloride. XAN-PLEX™ D and the polyacrylamide copolymer are not added at the same time. A preferred mixer to prevent "fish-eyeing" of the polymers is a shear device similar to Gauthier's Brothers, POLYGATOR GBR. The mixing equipment preferably is capable of very good agitation at high shear to disperse all of the ingredients—particularly the polymeric ingredients—to achieve a final smooth blend. Preferably, the mixing hopper is in-line so the sheared polymer goes directly into the mixing tank as opposed to using a low shear hopper and then "re-circulating" through the high shear device. The mixing pits also preferably have an impeller for proper mixing and dispersion of the polymers.

Preferably, calcium chloride or a 15 wt % calcium chloride brine is added to the mixture first, then NaCl is added to the mixture. After sufficient agitation, the polyacrylamide copolymer is sifted into the mixture with good agitation. After sufficient agitation, MIL-CARB™, MIL-BAR™, and any other additives, such as gas hydrate suppressors, are added to the mixture with agitation, as needed. To minimize sag of MIL-CARB™ and MIL-BAR™ during storage or transport, 3 lb/bbl of SALT WATER GEL® may be added and sheared well before transferring the fluid to the mixing pit. Before measuring the pH of the mud, the mud is diluted and thoroughly mixed. A preferred dilution is a ratio of 9 parts deionized water to 1 part mud.

If cement is to be drilled using the fluid of the invention, the fluid is protected from cement contamination. In order to prevent cement contamination, the acidic pretreatment product is added before any green cement (MIL-CARB™ or MIL-BAR™) is incorporated into the system to prevent pH effects on the biopolymer or filtration control agent. Citric acid powder (to reduce pH to ±7) is recommended as a pretreatment product and can be used more safely than commonly used liquid acetic acid to control mud pH while drilling cement.

As much "quality" premix mud is prepared at the mixing plant as possible so that the mud engineers on the rig can keep up with mud volume requirements of large diameter/high rate of penetration drilling operations. Otherwise, the polymers may be poorly dispersed, resulting in severe "fish-eyeing" and resultant screening problems.

Also provided is a method for increasing shale stability of a drilling system fluid containing the claimed brine by mixing a polyacrylamide copolymer with the brine, either before using the brine to formulate a drilling system fluid, or during operation as an additive to the drilling system fluid. If the polyacrylamide copolymer is used as an additive, an amount of copolymer preferably is added in increments of about 0.25 lb/bbl in order to achieve a surplus of polyacrylamide polymer in the filtrate of about 0.3 to about 1.0 lb/bbl.

The invention will be more clearly understood with reference to the following examples, which are illustrative only and should not be construed as limiting the present invention. In the following Examples, the following materials are trademarked products available from Baker Hughes INTEQ: XAN-PLEX™ D; DICAP™; MIL-BAR™; MIL-CARB™; BIO-PAQ™; and BIOLOSE™. REV-DUST™ is a trademark for a product which may be obtained from Mil-White Company, Houston, Tex. "Encapsulator D" is a commercially available shale inhibitor used for comparative purposes.

Background

Early laboratory investigations centered around the evaluation of primary viscosifiers for the proposed fluid. Further laboratory testing included an evaluation of XAN-VIS (clarified xanthan gum with greater calcium tolerance) vs. XAN-PLEX™ D polymer. Shale inhibition tests used shale wafers constructed from GOM "gumbo" and a pelletized bentonite product, "Hole Plug". Additional testing included an examination of the addition of cement treatment additives to prevent the detrimental effects of increased pH on the solubility or cross-linking of biopolymers.

Equipment

The following laboratory equipment was used in conducting the experiments described in the examples:
Mixer: Prince-Castle equipped with FANN B-7210 Blade or equivalent (3.0 mm (0.5±mm pitch)
Baffled, 2 liter, stainless conical mixing cups (Prototypes) from INTEQ-Houston Fluids
Mixer: Waring Blender with standard blade and mixing cup
Tachometer: hand held Model CT800 described in the RS Components Catalog or equivalent
Mixing Cup: 1 or 2 liter, conical cups, OFI Model 110-50 or equivalent
Balance: precision of 0.01 g (2000 g capacity)
Thermometer: precision of ±1° F. or ±0.5° C.
Thermometer-metal 1¾" dial, 8" stem Cole Palmer H08080-04 precision ±1% of dial range
Motor-Driven Direct Indicating Viscometer as referenced in API RP 13-B-1, $1^{st}$ Edition, June 1990, Par. 2.4
Filter Press as referenced in API RP 13B-1, $1^{st}$ Edition, June 1990, section 3.2
Filter Press as referenced in API RP 13B-1, $1^{st}$ Edition, June 1990, section 3.4
Aging Cells as referenced in API Recommended Practice 13-I, $5^{th}$ Edition, Jun. 1, 1995, section 19
Oven: regulated to desired temperature ±5° F. (±3° C.). Preferred ovens are digitally controlled with 1) dynamic air circulation, 2) temperature recorders and 3) data acquisition system
Glass jars for aging at temperatures <160° F. (450 ml capacity)

The following mixing procedures were used in the following examples:

Mixing Procedures

1. Mixer: Prince-Castle with FANN B7210 or equivalent blade
2. Mixing volume: 2 laboratory barrels (700 mls)
3. Total mixing time: 1 hour
4. Mixing speed: 9000 rpm
5. Mixing Temperature: Ambient to 150° F.
6. Order of addition: An important element of all laboratory testing included a product order of addition and mixing times required for complete product dispersion and/or solubility. The following describes the order of addition, and the mixing time for each product used in testing the formulations:

Component/Time, Min/Product
Viscosifier/10 min/XAN-PLEX D
Fluid Loss Control/10 min/BIO-LOSE™
11.6 lb/gal $CaCl_2$ brine/1 min/liquid phase
Shale Stabilizer/30 min/DFE-241/242, Encapsulator D
Bridging material/5 min/MIL-CARB
Contaminant/4 min/Rev Dust, cement Notes XAN-PLEX™ D was selected as the most cost effective viscosifier. Both Kelco XCD and XAN-PLEX™ D were used in all other tests.

Baffled mixing cups will reduce spillage and increase shear.

If mixing time for total product additions is less than the total mixing time, continue mixing fluid after the last product addition until the total mixing time has been reached.

After heat aging, mix fluid at 6000 rpm for 5 minutes prior to testing.

Use defoamer as necessary.

Inhibition tests included both the Hole-Plug and "gumbo wafer" tests.

EXAMPLE I

Throughout the first series of tests (Examples I–VIII), emphasis was placed on the performance of a 9.6–9.8 lb/gal $CaCl_2$ fluid; however, a limited number of tests were performed with a 12 lb/gal fluid to establish some continuity effect of the various additives. The calcium chloride content was maintained at 17 wt %. No change in recommended mixing procedures nor treatments were determined for the heavier fluid.

Quantitative data was difficult to obtain using laboratory screening tests. Some trends of screening efficiency could be seen. Three approaches were taken to quantify screening times. In each test, the time (in seconds) required for the majority of a fluid to pass through a screen or sieve under given conditions was measured. The cut-off time was based on visual retention on screen.

In the first test, 350 $cm^3$ of fluid was poured over an 8" sieve while hand held over a vibrator. In another test, a small 3" sonic sifter was briefly evaluated. In a third test, a mechanical shaker was constructed and used in making the measurements.

Effect of shear history and order of addition were considered in the screening series. Lower Prince Castle speeds, pre-dispersed xanthan gum and other shear devices including a Hamilton Beach Blender was part of the overall evaluation process.

Based on the results of these initial screening tests, a number of candidate fluids were selected for full scale screening.

EXAMPLE II

A full scale screen test was performed to evaluate the results of the laboratory study. This test was conducted on a Brandt Shale Shaker. Tests were made using 150 barrels of 9.7 lb/gal calcium chloride fluid as sheared by liquid mixing equipment and after high shear through a Gauthier Polygator device. The Gauthier Polygator device was found to do a superior job in the blending of fluid components, particularly when using the biopolymers. Screen sizes tested were 50's and 24's at an ambient temperature of 65–70° F., and flow rates of 250 gal/min, the maximum capacity that the return line could handle. The tested fluids did not exhibit screen blinding.

The results of all laboratory testing led to the development of a standard test fluid for an initial series of testing and screening of products. This formulation is described in the following Table:

| Composition | Concentration |
|---|---|
| Tap Water, bbl | 0.94 |
| XAN-PLEX ™ D, lb/bbl | 1 |
| DFE-241*, lb/bbl | 1 |
| $CaCl_2$ | 66 |
| BIO-PAQ ™, lb/bbl | 3 |
| MIL-CARB ™, lb/bbl | 10 |

| Properties | Initial | Aged |
|---|---|---|
| Density, lb/gal | 9.6 | 9.6 |
| PV, cP | 15 | 14 |
| YP, lb/100 $ft^2$ | 21 | 18 |
| 10" Gel, lb/100 $ft^2$ | 4 | 3 |
| 10" Gel/lb/100 $ft^2$ | 6 | 4 |
| API, cc/30 min | 4 | 3.2 |
| HTHP**, cc/30 min | | 10.2 |

*DFE-241 was a precursor to DICAP ™ with a similar composition but a higher molecular weight (about one to about 6,000,000 mole weight).
**16 hours at 200° F.

EXAMPLE III

Further tests were conducted using a fluid having the foregoing composition. Testing concerned with the effects of static and hot roll aging on shale wafers and Hole Plug bentonite pellets. For these tests, an encapsulator was added at a 1 lb/bbl concentration to the base fluid. The results of these tests are outlined in the following Table. There was only a small change in the hardness of the shale wafer with 100% recovery. In the case of the Hole Plug, there was an 89.3% recovery after aging.

| Measurement | Static Shale Wafer | Dynamic Hole Plug |
|---|---|---|
| Temperature Aged, ° F. | 100 | 100 |
| Hours Aged | 40 | 40 |
| Initial Hardness | 93 | — |
| Final Hardness | 66 | — |
| Hardness Chg., % | 29 | — |
| Recovery, % | 100 | 89.3 |
| Hydration, % | 13.1 | — |

EXAMPLE IV

Tests continued using a similar 17% $CaCl_2$ base mud with other encapsulating additives to determine the product yielding the most benefit from the standpoint of shale inhibition and screening times. The following results were seen:

| | Base | DFE-241 | DFE-242 |
|---|---|---|---|
| Composition | | | |
| Tapwater, bbl | 0.63 | 0.63 | 0.63 |
| XAN-PLEX ™ D, ppb | 0.9 | 0.9 | 0.9 |
| BIO-PAQ ™, ppb | 3 | 3 | 3 |
| 11.6 ppg, $CaCl_2$, bbl | 0.37 | 0.37 | 0.37 |
| DFE-241, ppb | | 1 | |
| DFE-242, ppb | | | 1 |
| MIL-CARB ™, ppb | 10 | 10 | 10 |
| Properties[1] | | | |
| Fann 600 rpm | 29 | 43 | 42 |
| Fann 300 rpm | 20 | 30 | 30 |
| Fann 200 rpm | 16 | 24 | 24 |
| Fann 100 rpm | 16 | 17 | 17 |
| Fann 6 rpm | 4 | 5 | 6 |

-continued

|  | Base | DFE-241 | DFE-242 |
|---|---|---|---|
| Fann 3 rpm | 3 | 4 | 4 |
| PV, cP | 9 | 13 | 12 |
| YP, lb/100 ft$^2$ | 11 | 17 | 18 |
| 10" Gel, lb/100 ft$^2$ | 3 | 5 | 6 |
| 10' Gel, lb/100 ft$^2$ | 4 | 6 | 7 |
| Hole Plug Data$^2$ |  |  |  |
| Retained % | 78 | 96 | 95 |
| Shale Water Data$^3$ |  |  |  |
| Initial Hardness | 97 | 97 | 97 |
| Final Hardness | 49 | 67 | 75 |
| Hardness, Chg % | 49 | 31 | 23 |
| Hydration, % | 25 | 20 | 19 |
| Vol Change, % | 55 | 34 | 32 |

[1] Properties taken after hot rolling @ 100° F. for 16 hours
[2] After hot rolling @ 110–120° F. for 40 hours
[3] After static aging @ 110–120° F. for 40 hours The encapsulating polymers provided good recovery, hardness and volume change in the test specimens with DICAP™ providing the best results for the shale wafer tests in hardness change.

EXAMPLE V

A test series was performed to study the effects of shear (high vs. low) and mixing time after the addition of the various components and the ability to screen these muds through a fine mesh shaker screen. The systems were mixed using two different mixing devices; a Prince Castle mixer with controllable rpm to represent the results obtained from low shear mixing, and a Waring Blender for high shear mixing. The following Table tabulates the results of these tests.

|  | Mixing Time, min. | | | |
|---|---|---|---|---|
|  | High Shear[1] | | Low Shear[2] | |
|  | #1 | #2 | #3 | #4 |
| Composition |  |  |  |  |
| Tapwater, 0.63 bbl | 0 | 0 | 0 | 0 |
| XAN-PLEX ™ D, 0.9 lb/bbl | 5 | 5 | 5 | 5 |
| BIO-PAQ ™, 3.0 lb/bbl | 5 | 10 | 10 | 10 |
| 11.6 ppg CaCl$_2$, 0.37 bbl | 5 | 5 | 5 | 5 |
| DFE-241, 1.0 LB/BBL | 20 | 30 | 60 | 90 |
| MIL-CARB ™, 10.0 lb/bbl | 5 | 10 | 10 | 10 |
| Properties before REV DUST ™ |  |  |  |  |
| Density, lb/gal | 9.7 | 9.7 | 9.7 | 9.7 |
| Fann 600 rpm | 42 | 49 | 47 | 46 |
| Fann 300 rpm | 29 | 34 | 33 | 33 |
| Fann 200 rpm | 23 | 28 | 27 | 27 |
| Fann 100 rpm | 15 | 20 | 19 | 19 |
| Fann 6 rpm | 5 | 6 | 5 | 6 |
| Fann 3 rpm | 4 | 4 | 4 | 4 |
| AV, cP | 21 | 24.5 | 23.5 | 23 |
| PV, cP | 13 | 15 | 14 | 13 |
| YP, lb/100 ft$^2$ | 16 | 19 | 19 | 20 |
| 10" Gel, lb/100 ft$^2$ | 6 | 6 | 6 | 6 |
| 10' Gel, lb/100 ft$^2$ | 6 | 7 | 7 | 7 |
| Properties after 10 ppb REV DUST ™ |  |  |  |  |
| Fann 600 rpm | 50 | 59 | 56 | 55 |
| Fann 300 rpm | 34 | 41 | 39 | 38 |
| Fann 200 rpm | 28 | 34 | 32 | 31 |
| Fann 100 rpm | 20 | 25 | 23 | 22 |
| Fann 6 rpm | 6 | 8 | 7 | 7 |
| Fann 3 rpm | 4 | 6 | 5 | 5 |
| AV, cP | 25 | 29.5 | 28 | 27.5 |
| PV, cP | 16 | 17 | 17 | 17 |
| YP, lb/100 ft$^2$ | 18 | 24 | 28 | 21 |
| 10" Gel, lb/100 ft$^2$ | 5 | 7 | 6 | 6 |
| 10' Gel, lb/100 ft$^2$ | 6 | 8 | 7 | 7 |
| Add 20 ppb Hole Plug, mix 10 min. @ 1000 rpm and screen |  |  |  |  |
| Screen Time$^3$, sec/350 cm$^3$ | 115 | 26 | 85 | 24 |

[1] high shear condition: Hamilton Beach mixer @ 60 volts
[2] low shear condition: Prince-Castle mixer @ 3500 rpm
[3] 45 mesh screen on Chesser Thresher @ 50 volts The high shear in the first case considerably extended the amount of time required to screen the sample. This could be attributed to the incorporation of air into the sample, giving it a "fluffy" texture, or the additional mixing time on the polymer fluid loss control product or the encapsulator. In the case of the low shear mixing tests, mixing time is a significant factor in the ability to screen the sample.

EXAMPLE VI

Following further laboratory tests and the full scale liquid mud plant investigation, the opportunity for an on site test at an offshore drilling location presented itself. A major operator had previously drilled three prior offset wells in deepwater offshore Gulf of Mexico ("GOM"). Two of the three wells employed a CaCl$_2$ fluid and the third drilled with a NaCl/PHPA fluid. In the three wells, it required an average of 1½ additional drilling days because of severe screen blinding. Blinded screens had to be constantly changed which required an interruption of the drilling operation. Associated mud solids build-up contributed to this problem.

The available rig mixing equipment was not satisfactory for proper dispersion of polymer products mixed on location. Polymer "fish eyes" were observed being discarded as well as contributing to the "blinding" of the shaker screens. This further points to the need for better rig mixing equipment and/or product enriched, properly blended muds for volume building being mixed onshore and transported to the rig site. The correct land based mixing equipment does not preclude the need for similar rig equipment, as it is not always practical to mix all systems at a shore based operation.

A deepwater CaCl$_2$ system was developed and field tested in the GOM. The CaCl$_2$/DICAP™ system proved successful in controlling the gumbo without severe screen blinding. Instantaneous drill rates up to 200 ft/hr were experienced during the drilling of the gumbo section. Drilling days and cost per foot for this section were substantially reduced. Estimated savings was four drilling days, or approximately $800,000 in rig costs.

In summary, the enhanced encapsulation of the CaCl$_2$/DICAP™ mud system increased ROP, improved solids removal efficiency, and reduced overall interval drilling cost through the gumbo section.

EXAMPLE VII

Additional laboratory work was performed to determine the best formulation for a calcium chloride only base polyacrylamide copolymer to be used in the drilling system fluid. The polyacrylamide copolymer used in the foregoing experiments was DFE 241, a relatively high molecular weight version of DICAP™ (with about 6,000,000 mole weight). Laboratory testing found that a lower mole weight version polyacrylamide copolymer, with about 4,000,000 mole weight, was more effective.

EXAMPLE VIII

Numerous laboratory tests were conducted to evaluate the benefits of an encapsulator-in $CaCl_2$ fluids. Results were compared using an untreated $CaCl_2$ base fluid against one treated with DICAP™ and another with Encapsulator D. No pH adjustments were made in this test series. This data is reported in the following Table. It will be noted that DICAP™ gave a significantly greater percentage of sample recovery after aging the samples dynamically for 40 hours at 100° F. and 150° F. aging temperatures.

|  | Base Fluid | DICAP Fluid | Encapsulator D Fluid |
|---|---|---|---|
| Composition |  |  |  |
| $CaCl_2$, wt. % | 20 | 20 | 20 |
| XAN-PLEX ™ D, lb/bbl | 0.9 | 0.9 | 0.9 |
| BIO-PAQ ™, lb/bbl | 3.0 | 3.0 | 3.0 |
| DICAP ™, lb/bbl | — | 1.0 | — |
| Encapsulator D, lb/bbl |  |  | 1.0 |
| MIL-CARB ™, lb/bbl | 10 | 10 | 10 |
| Properties |  |  |  |
| Density, lb/gal | 10.2 | 10.2 | 10.2 |
| AV, cP | 20 | 31 | 24.5 |
| PV, cP | 13 | 21 | 15 |
| YP, lb/100 ft² | 14 | 20 | 19 |
| Results after dynamically aging 40 hours @ 100 F. |  |  |  |
| Hole Plug retained, % | 83.5 | 99.0 | 87.1 |
| Results after dynamically aging 40 hours @ 150 F. |  |  |  |
| Hole Plug retained, % | 74.8 | 90.2 | 84.8 |

In these and other tests using Hole Plug bentonite pellets, varying degrees of solids recovery were noted following aging in different brine/polymer mixtures. The sample aged in 20% CaCl2 containing one (1) pound per barrel DICAP™ exhibited the least deterioration of any other salt/polymer combination.

EXAMPLE IX

Additional studies were done using a mixture of sodium chloride and calcium chloride. The calcium chloride content was varied from 14 to 17 wt %. The following basic formulation was used in the tests:

| XAN-PLEX D | 0.5–1.25 lb/bbl |
|---|---|
| BIO-LOSE | 1–3 lb/bbl |
| Brine Water | <18 wt % $CaCl_2$ |
| NaCl | 0–70 lb/bbl |
| DFE-243 | 0.5–1.5 lb/bbl |
| DFE-520/DFE521* | 0–4 lb/bbl |
| MIL-CARB | 10 lb/bbl |
| $NF_2/NF_3$ | As needed for gas hydrates |

*DFE-243, DFE-520 and 521 are internal designations under which these materials may be purchased from Baker Hughes INTEQ.

The above formulation was tested at varying densities. The results of the tests are listed in the following Table:

|  | 10 ppg | | 13 ppg | | 15 ppg | |
|---|---|---|---|---|---|---|
| Water, bbl | 0.75 | 0.75 | 0.67 | 0.67 | 0.62 | 0.62 |
| Xan Plex D, lb/bbl | 1 | 1 | 0.9 | 0.9 | 0.82 | 0.82 |
| Bio Lose, lb/bbl | 3 | 3 | 2.7 | 2.7 | 2.5 | 2.5 |
| NaCl, lb/bbl | 60 | 60 | 54 | 54 | 49 | 49 |
| 11.6 ppg CaCl2, lb/bbl | 0.17 | 0.17 | 0.15 | 0.15 | 0.14 | 0.14 |
| DFE-243, lb/bbl | 1 | 1 | 0.9 | 0.9 | 0.82 | 0.82 |
| DFE-521, lb/bbl | 2 | 2 | 2.2 | 2.8 | 2.5 | 3.5 |
| Mil Carb, lb/bbl | 10 | 10 | 9 | 9 | 8.2 | 8.2 |
| Mil Bar, lb/bbl | / | / | 160 | 160 | 273 | 273 |
| MgO, lb/bbl | 0.5 | 0.5 | 0.45 | 0.45 | 0.41 | 0.41 |
| NF3, bbl | / | / | / | / | 0.04 | 0.06 |
| Solids*, % | 4 | 6 | 4 | 6 | 4 | 6 |
| Properties after aging |  |  |  |  |  |  |
| HR @ 150° F. | 16 hrs | 16 hrs | 16 hrs | 16 hrs | 16 hrs | 16 hrs |
| Static aging @ 200° F. | / | 16 hrs | / | 16 hrs | / | 16 hrs |
| Shearing after aging? | No | Yes | No | Yes | No | Yes |
| PV @ 120° F. | 11 | 11 | 22 | 19 | 33 | 44 |
| YP | 15 | 14 | 21 | 20 | 33 | 30 |
| 10" Gel | 3 | 4 | 5 | 5 | 6 | 6 |
| 10' Gel | 5 | 6 | 6 | 7 | 8 | 9 |
| Density, ppg | 10.5 | 10.7 | 13.2 | 13.2 | 15 | 15 |
| API Filtrate, ml | 4.7 | 9 | 9.5 | 9 | 9.8 | 5.1 |
| HTHP @ 200 F., ml | 14 | 21.2 | 17 | 23 | 20.6 | 35 |

Solids: 1:1 blended Rev Dust + ground Vol clay

The addition of a mixture of salts including sodium chloride aided in gas hydrate suppression as well as density control. The polyacrylamide DFE-243 has a low molecular weight of from about 800,000 to 1 million mole weight and has about a 5% cationic charge, which improved the API and HTHP filtration results and lowered the coagulation of low gravity solids. Colloid stabilizers DFE520/521, available from Baker Hughes INTEQ, were used to offset the degree of coagulation and provide extra filter control.

EXAMPLE X

The procedures of Examples I–IX are repeated using candidates with the following salts: chloride, bromide, formate, propionate, sulfate, acetate, carbonate, and nitrate salts of calcium, magnesium, zinc, and aluminum. Each of the foregoing salts is used both with and without chloride, bromide, formate, propionate, sulfate, acetate, carbonate, and nitrate salts of sodium, potassium, cesium, and lithium. Each of the candidates is tested at a charge density of at least 1% and 1.1% and at a charge density decreasing by 0.1% for five intervals: namely, 0.9%, 0.8%, 0.7%, 0.6%. Candidates having a charge density increasing from 1% up to 16% at 0.25% intervals also are tested.

In one set of candidates, the polyacrylamide units are consistently partially hydrolyzed polyacrylamide and at least five different $R^3$'s from each of the following groups are tested: ester groups; hydrogen; cyclic, linear, and branched alkyl and heteroalkyl groups having from about 1 to about 6 carbon atoms wherein said heteroalkyl groups comprise one or more heteroatoms selected from the group consisting of nitrogen and oxygen; cyclic, linear, and branched alkenyl and heteroalkenyl groups having from about 1 to about 6 carbon atoms and resonance hybrids thereof; carboxylic acid groups and salts, esters, and amides thereof comprising cyclic, linear, and branched alkyl groups, heteroalkyl groups, alkenyl groups, and heteroalkenyl groups having from about 1 to about 6 carbon atoms wherein said hetero groups comprise one or more heteroatoms selected from the group consisting of nitrogen and oxygen; aromatic groups; alkanols and alkenols having from about 1 to about 6 carbon atoms; alkanolamides and alkenol amides having from about 1 to about 6 carbon atoms; and combinations thereof.

The foregoing candidates include an $R^3$ from each of the following groups: ester groups; vinyl pyrrolidone; vinyl alcohol; piperazine; aminoethyl piperazine; styrene; alkyl groups and alkenyl groups having from about 1 to about 6 carbon atoms; trimethyl aminoethyl groups; alkoxylated alkyl groups and alkenyl groups having from about 1 to about 6 carbon atoms; alkenyl alcohols having from about 1 to about 6 carbon atoms; piperazines; styrene; alkyl groups having from about 1 to about 6 carbon atoms; alkoxylated alkyl groups and alkenyl groups having from about 1 to about 6 carbon atoms; acrylonitrile groups; acrylate and methacrylate groups; alkanolamides having from about 1 to about 6 carbon atoms; and vinyl amide.

In another set of candidates, $R^3$ consistently is a trimethylaminoethyl group and at least five different candidates are tested from each of the following $R^2$ groups: hydrogen; cyclic, linear, and branched alkyl and heteroalkyl groups having from about 1 to about 6 carbon atoms wherein said heteroalkyl groups comprise one or more heteroatoms selected from the group consisting of nitrogen and oxygen; cyclic, linear, and branched alkenyl and heteroalkenyl groups having from about 1 to about 6 carbon atoms and resonance hybrids thereof, carboxylic acid groups and salts, esters, and amides thereof comprising cyclic, linear, and branched alkyl groups, heteroalkyl groups, alkenyl groups, and heteroalkenyl groups having from about 1 to about 6 carbon atoms wherein said hetero groups comprise one or more heteroatoms selected from the group consisting of nitrogen and oxygen; aromatic groups; alkanols and alkenols having from about 1 to about 6 carbon atoms; alkanolamides and alkenol amides having from about 1 to about 6 carbon atoms; and combinations thereof.

The foregoing candidates include an $R^2$ from each of the following groups: vinyl pyrrolidone; vinyl alcohol; piperazine; aminoethyl piperazine; styrene; alkyl groups and alkenyl groups having from about 1 to about 6 carbon atoms; trimethyl aminoethyl groups; alkoxylated alkyl groups and alkenyl groups having from about 1 to about 6 carbon atoms; alkenyl alcohols having from about 1 to about 6 carbon atoms; piperazines; styrene; alkyl groups having from about 1 to about 6 carbon atoms; alkoxylated alkyl groups and alkenyl groups having from about 1 to about 6 carbon atoms; acrylonitrile groups; acrylate and methacrylate groups; alkanolamides having from about 1 to about 6 carbon atoms; and vinyl amide.

In another set of candidates, both $R^2$ and $R^3$ are randomly varied to produce at least 100 combinations of the following $R^2$ and $R^3$ groups:

$R^3$: ester groups; vinyl pyrrolidone; vinyl alcohol; piperazine; aminoethyl piperazine; styrene; alkyl groups and alkenyl groups having from about 1 to about 6 carbon atoms; trimethyl aminoethyl groups; alkoxylated alkyl groups and alkenyl groups having from about 1 to about 6 carbon atoms; alkenyl alcohols having from about 1 to about 6 carbon atoms; piperazines; styrene; alkyl groups having from about 1 to about 6 carbon atoms; alkoxylated alkyl groups and alkenyl groups having from about 1 to about 6 carbon atoms; acrylonitrile groups; acrylate and methacrylate groups; alkanolamides having from about 1 to about 6 carbon atoms; and vinyl amide.

$R^2$: hydrogen; cyclic, linear, and branched alkyl and heteroalkyl groups having from about 1 to about 6 carbon atoms wherein said heteroalkyl groups comprise one or more heteroatoms selected from the group consisting of nitrogen and oxygen; cyclic, linear, and branched alkenyl and heteroalkenyl groups having from about 1 to about 6 carbon atoms and resonance hybrids thereof; carboxylic acid groups and salts, esters, and amides thereof comprising cyclic, linear, and branched alkyl groups, heteroalkyl groups, alkenyl groups, and heteroalkenyl groups having from about 1 to about 6 carbon atoms wherein said hetero groups comprise one or more heteroatoms selected from the group consisting of nitrogen and oxygen; aromatic groups; alkanols and alkenols having from about 1 to about 6 carbon atoms; alkanolamides and alkenol amides having from about 1 to about 6 carbon atoms; and combinations thereof. At least one of the five candidates comprises one of the following $R^2$ groups: vinyl pyrrolidone; vinyl alcohol; piperazine; aminoethyl piperazine; styrene; alkyl groups and alkenyl groups having from about 1 to about 6 carbon atoms; trimethyl aminoethyl groups; alkoxylated alkyl groups and alkenyl groups having from about 1 to about 6 carbon atoms; alkenyl alcohols having from about 1 to about 6 carbon atoms; piperazines; styrene; alkyl groups having from about 1 to about 6 carbon atoms; alkoxylated alkyl groups and alkenyl groups having from about 1 to about 6 carbon atoms; acrylonitrile groups; acrylate and methacrylate groups; alkanolamides having from about 1 to about 6 carbon atoms; and vinyl amide.

Each candidate system having a charge density of at least 1% proves successful in controlling gumbo shale without severe screen blinding. The candidate systems having a charge density of at least 1% increase ROP, improve solids removal efficiency, and reduce overall interval drilling cost through the gumbo section. The addition of a mixture of salts including sodium chloride aids in gas hydrate suppression as well as density control.

EXAMPLE XI

The foregoing candidates are tested and the candidates having a charge density of at least 1% prove successful as gravel packing fluids according to the procedures described in U.S. Pat. No. 6,211,120, incorporated herein by reference.

Many modifications may be made to the present invention without departing from the spirit and scope of the present invention. The embodiment described herein is meant to be illustrative only and should not be taken as limiting the invention, which is defined in the following claims.

What is claimed is:

1. A drilling system fluid comprising:

water as a continuous phase;

a first amount of a multivalent metal salt;

a second amount of a monovalent salt, said second amount being sufficient to increase gas hydrate suppression and decrease density when compared to said fluid consisting essentially of said multivalent salt in the absence of said monovalent salt;

a quantity of water soluble polyacrylamide copolymer having a cationic charge density of at least about 1% and having the following general structure:

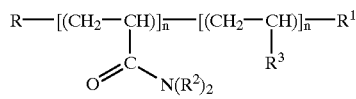

wherein R and R¹ independently are selected from the group consisting of hydrogen, acrylamide groups, acrylate groups, polyacrylamide groups, and polyacrylate groups, and copolymers thereof;

R² independently is selected from the group consisting of moieties effective to maintain said water solubility under use conditions;

R³ is selected from groups comprising a charge in the range of from about +1 to about +4; and n independently is at least 1.

2. The fluid of claim 1 wherein said cationic charge density is from about 1% to about 15%.

3. The fluid of claim 1 wherein said cationic charge density is from about 5% to about 10%.

4. The fluid of claim 1 wherein said multivalent metal salt is a divalent metal salt.

5. The fluid of claim 1 wherein said multivalent metal salt comprises a calcium metal salt.

6. The fluid of claim 1, wherein said multivalent salt is calcium chloride and said monovalent salt is sodium chloride.

7. The fluid of claim 6, wherein said calcium chloride is from about 5 wt % to about 20 wt %, and said sodium chloride is about 40 lb/bbl to about 70 lb/bbl.

8. The fluid of claim 2 wherein said polyacrylamide copolymer has a molecular weight of from about 800,000 to about 1 million mole weight.

9. The fluid of claim 3 wherein said polyacrylamide copolymer has a molecular weight of from about 800,000 to about 1 million mole weight.

10. The fluid of claim 4 wherein said polyacrylamide copolymer has a molecular weight of from about 800,000 to about 1 million mole weight.

11. The fluid of claim 5 wherein said polyacrylamide copolymer has a molecular weight of from about 800,000 to about 1 million mole weight.

12. The fluid of claim 1 wherein said polyacrylamide copolymer has a molecular weight of from about 800,000 to about 1 million mole weight.

13. The fluid of claim 7 wherein said polyacrylamide copolymer has a molecular weight of from about 800,000 to about 1 million mole weight.

14. The fluid of claim 6 wherein said polyacrylamide copolymer has a molecular weight of from about 800,000 to about 1 million mole weight.

15. The fluid of claim 2 wherein R¹ independently is selected from moieties selected from the group consisting of hydrogen; cyclic, linear, and branched alkyl and heteroalkyl groups having from about 1 to about 6 carbon atoms wherein said heteroalkyl groups comprise one or more heteroatoms selected from the group consisting of nitrogen and oxygen; cyclic, linear, and branched alkenyl and heteroalkenyl groups having from about 1 to about 6 carbon atoms and resonance hybrids thereof; carboxylic acid groups and salts, esters, and amides thereof comprising cyclic, linear, and branched alkyl groups, heteroalkyl groups, alkenyl groups, and heteroalkenyl groups having from about 1 to about 6 carbon atoms wherein said hetero groups comprise one or more hetero atoms selected from the group consisting of nitrogen and oxygen; aromatic groups; alkanols and alkenols having from about 1 to about 6 carbon atoms; alkanolamides and alkenol amides having from about 1 to about 6 carbon atoms; and combinations thereof.

16. The fluid of claim 3 wherein R² independently is selected from moieties selected from the group consisting of hydrogen; cyclic, linear, and branched alkyl and heteroalkyl groups having from about 1 to about 6 carbon atom; wherein said heteroalkyl groups comprise one or more heteroatoms selected from the group consisting of nitrogen and oxygen; cyclic, linear, and branched alkenyl and heteroalkenyl groups having from about 1 to about 6 carbon atoms and resonance hybrids thereof; carboxylic acid groups and salts, esters, and amides thereof comprising cyclic, linear, and branched alkyl groups, heteroalkyl groups, alkenyl groups, and heteroalkenyl groups having from about 1 to about 6 carbon atoms wherein said hetero groups comprise one or more heteroatoms selected from the group consisting of nitrogen and oxygen; aromatic groups; alkanols arid alkenols having from about 1 to about 6 carbon atoms; alkanolamides and alkenol amides having from about 1 to about 6 carbon atoms; and combinations thereof.

17. The fluid of claim 4 wherein R² independently is selected from moieties selected from the group consisting of hydrogen; cyclic, linear, and branched alkyl and heteroalkyl groups having from about 1 to about 6 carbon atoms wherein said heteroalkyl groups comprise one or more heteroatoms selected from the group consisting of nitrogen and oxygen; cyclic, linear, and branched alkenyl and heteroalkenyl groups having from about 1 to about 6 carbon atoms and resonance hybrids thereof; carboxylic acid groups and salts, esters, and amides thereof comprising cyclic, linear, and branched alkyl groups, heteroalkyl groups, alkenyl groups, and heteroalkenyl groups baying from about 1 to about 6 carbon atoms wherein said hetero groups comprise one or more heteroatoms selected from the group consisting of nitrogen and oxygen; aromatic groups: alkanols and alkenols having from about 1 to about 6 carbon atoms; alkanolamides and alkenol amides having from about 1 to about 6 carbon atoms; and combinations thereof.

18. The fluid of claim 5 wherein R² independently is selected from moieties selected from the group consisting of hydrogen; cyclic, linear, and branched alkyl and heteroalkyl groups having from about 1 to about 6 carbon atoms wherein said heteroalkyl groups comprise one or more heteroatoms selected from the group consisting of nitrogen and oxygen; cyclic, linear, and branched alkenyl and heteroalkenyl groups having from about 1 to about 6 carbon atoms and resonance hybrids thereof; carboxylic acid groups and salts, esters, and amides thereof comprising cyclic, linear, and branched alkyl groups, heteroalkyl groups, alkenyl groups, and heteroalkenyl groups having from about 1 to about 6 carbon atoms wherein said hetero groups comprise one or more heteroatoms selected from the group consisting of nitrogen and oxygen; aromatic groups; alkanols and alkenols having from about 1 to about 6 carbon atoms; alkanolamides and alkenol amides having from about 1 to about 6 carbon atoms; and combinations thereof.

19. The fluid of claim 6 wherein R² independently is selected from moieties selected from the group consisting of hydrogen; cyclic, linear, and branched alkyl and heteroalkyl groups having from about 1 to about 6 carbon atoms wherein said heteroalkyl groups comprise one or more heteroatoms selected from the group consisting of nitrogen and oxygen; cyclic, linear, and branched alkenyl and heteroalkenyl groups having from about 1 to about 6 carbon atoms and resonance hybrids thereof; carboxylic acid groups and salts, esters, and amides thereof comprising cyclic, linear, and branched alkyl groups, heteroalkyl groups, alkenyl groups, and heteroalkenyl groups having from about 1 to about 6 carbon atoms wherein said hetero groups comprise one or more heteroatoms selected from the group consisting of nitrogen and oxygen; aromatic groups; alkanols and alkenols having from about 1 to about 6 carbon atoms; alkanolamides and alkenol amides having from about 1 to about 6 carbon atoms; and combinations thereof.

20. The fluid of claim 13 wherein $R^2$ independently is selected from moieties selected from the group consisting of hydrogen; cyclic, linear, and branched alkyl and heteroalkyl groups having from about 1 to about 6 carbon atoms wherein said heteroalkyl groups comprise one or more heteroatoms selected from the group consisting of nitrogen and oxygen; cyclic, linear, and branched alkenyl and heteroalkenyl groups having from about 1 to about 6 carbon atoms and resonance hybrids thereof; carboxylic acid groups and salts, esters, and amides thereof comprising cyclic, linear, and branched alkyl groups, heteroalkyl groups, alkenyl groups, and heteroalkenyl groups having from about 1 to about 6 carbon atoms wherein said hetero groups comprise one or more heteroatoms selected from the group consisting of nitrogen and oxygen; aromatic groups; alkanols and alkenols having from about 1 to about 6 carbon atoms; alkanolamides and alkenol amides having from about 1 to about 6 carbon atoms; and combinations thereof.

21. The fluid of claim 7 wherein $R^2$ independently is selected from moieties selected from the group consisting of hydrogen; cyclic, linear, and branched alkyl and heteroalkyl groups having from about 1 to about 6 carbon atoms wherein said heteroalkyl groups comprise one or more heteroatoms selected from the group consisting of nitrogen and oxygen; cyclic, linear, and branched alkenyl and heteroalkenyl groups having from about 1 to about 6 carbon atoms and resonance hybrids thereof; carboxylic acid groups and salts, esters, and amides thereof comprising cyclic, linear, and branched alkyl groups, heteroalkyl groups, alkenyl groups, and heteroalkenyl groups having from about 1 to about 6 carbon atoms wherein said hetero groups comprise one or more heteroatoms selected from the group consisting of nitrogen and oxygen; aromatic groups; alkanols and alkenols having from about 1 to about 6 carbon atoms; alkanolamides and alkenol amides having from about 1 to about 6 carbon atoms; and combinations thereof.

22. The fluid of claim 2 wherein $R^2$ independently is selected from the group consisting of hydrogen, alkenyl pyrrolidones; alkenols; piperazines; styrenes; cyclic, linear, and branched alkyl, alkenyl, heteroalkyl, and heteroalkenyl groups having from about 1 to about 6 carbon atoms, wherein said heteroalkyl or heteroalkenyl groups comprise one or more heteroatom selected from the group consisting of nitrogen and oxygen; alkoxylated alkenyl groups having from about 1 to about 6 carbon atoms; acrylonitriles; acrylate groups; methacrylate groups; alkanolamides having from about 1 to about 6 carbon atoms; and alkenyl amides having from about 1 to about 6 carbon atoms.

23. The fluid of claim 3 wherein $R^2$ independently is selected from the group consisting of hydrogen, alkenyl pyrrolidones; alkenols; piperazines; styrenes; cyclic, linear, and branched alkyl, alkenyl, heteroalkyl, and heteroalkenyl groups having from about 1 to about 6 carbon atoms, wherein said heteroalkyl or heteroalkenyl groups comprise one or more heteroatom selected from the group consisting of nitrogen and oxygen; alkoxylated alkenyl groups having from about 1 to about 6 carbon atoms; acrylonitriles; acrylate groups; methacrylate groups; alkanolamides having from about 1 to about 6 carbon atoms; and alkenyl amides having from about 1 to about 6 carbon atoms.

24. The fluid of claim 4 wherein $R^2$ independently is selected from the group consisting of hydrogen, alkenyl pyrrolidones; alkenols; piperazines; styrenes; cyclic, linear, and branched alkyl, alkenyl, heteroalkyl, and heteroalkenyl groups having from about 1 to about 6 carbon atoms, wherein said heteroalkyl or heteroalkenyl groups comprise one or more heteroatom selected from the group consisting of nitrogen and oxygen; alkoxylated alkenyl groups having from about 1 to about 6 carbon atoms; acrylonitriles; acrylate groups; methacrylate groups; alkanolamides having from about 1 to about 6 carbon atoms; and alkenyl amides having from about 1 to about 6 carbon atoms.

25. The fluid of claim 5 wherein $R^2$ independently is selected from the group consisting of hydrogen, alkenyl pyrrolidones; alkenols; piperazines; styrenes; cyclic, linear, and branched alkyl, alkenyl, heteroalkyl, and heteroalkenyl groups having from about 1 to about 6 carbon atoms, wherein said heteroalkyl or heteroalkenyl groups comprise one or more heteroatom selected from the group consisting of nitrogen and oxygen; alkoxylated alkenyl groups having from about 1 to about 6 carbon atoms; acrylonitriles; acrylate groups; methacrylate groups; alkanolamides having from about 1 to about 6 carbon atoms; and alkenyl amides having from about 1 to about 6 carbon atoms.

26. The fluid of claim 6 wherein $R^2$ independently is selected from the group consisting of hydrogen, alkenyl pyrrolidones; alkenols; piperazines; styrenes; cyclic, linear, and branched alkyl, alkenyl, heteroalkyl, and heteroalkenyl groups having from about 1 to about 6 carbon atoms, wherein said heteroalkyl or heteroalkenyl groups comprise one or more heteroatom selected from the group consisting of nitrogen and oxygen; alkoxylated alkenyl groups having from about 1 to about 6 carbon atoms; acrylonitriles; acrylate groups; methacrylate groups; alkanolamides having from about 1 to about 6 carbon atoms; and alkenyl amides having from about 1 to about 6 carbon atoms.

27. The fluid of claim 13 wherein $R^2$ independently is selected from the group consisting of hydrogen, alkenyl pyrrolidones; alkenols; piperazines; styrenes; cyclic, linear, and branched alkyl, alkenyl, heteroalkyl, and heteroalkenyl groups having from about 1 to about 6 carbon atoms, wherein said heteroalkyl or heteroalkenyl groups comprise one or more heteroatom selected from the group consisting of nitrogen and oxygen; alkoxylated alkenyl groups having from about 1 to about 6 carbon atoms; acrylonitriles; acrylate groups; methacrylate groups; alkanolamides having from about 1 to about 6 carbon atoms; and alkenyl amides having from about 1 to about 6 carbon atoms.

28. The fluid of claim 7 wherein $R^2$ independently is selected from the group consisting of hydrogen, alkenyl pyrrolidones; alkenols; piperazines; styrenes; cyclic, linear, and branched alkyl, alkenyl, heteroalkyl, and heteroalkenyl groups having from about 1 to about 6 carbon atoms, wherein said heteroalkyl or heteroalkenyl groups comprise one or more heteroatom selected from the group consisting of nitrogen and oxygen; alkoxylated alkenyl groups having from about 1 to about 6 carbon atoms; acrylonitriles; acrylate groups; methacrylate groups; alkanolamides having from about 1 to about 6 carbon atoms; and alkenyl amides having from about 1 to about 6 carbon atoms.

29. The fluid of claim 14 wherein $R^2$ independently is selected from the group consisting of hydrogen, alkenyl pyrrolidones; alkenols; piperazines; styrenes; cyclic, linear, and branched alkyl, alkenyl, heteroalkyl, and heteroalkenyl groups having from about 1 to about 6 carbon atoms, wherein said heteroalkyl or heteroalkenyl groups comprise one or more heteroatom selected from the group consisting of nitrogen and oxygen; alkoxylated alkenyl groups having from about 1 to about 6 carbon atoms; acrylonitriles; acrylate groups; methacrylate groups; alkanolamides having from about 1 to about 6 carbon atoms; and alkenyl amides having from about 1 to about 6 carbon atoms.

30. The fluid of claim 1 wherein $R^2$ is selected from the group consisting of hydrogen, vinyl pyrrolidones; vinyl alcohols; piperazines; aminoalkyl piperazines comprising an alkyl group having from about 1 to about 6 carbon atoms; linear, branched and cyclic alkyl, alkenyl, heteroalkyl and heteroalkenyl groups having from about 1 to about 6 carbon atoms, wherein said heteroalkyl or heteroalkenyl groups comprise one or more heteroatom selected from the group consisting of nitrogen and oxygen; aromatic groups comprising an alkenyl substitutent having from about 1 to about 6 carbon atoms; alkoxylated alkyl groups and alkenyl groups having from about 1 to about 6 carbon atoms; acrylonitrile groups; acrylate and methacrylate groups; alkanolamides and alkenolamides having from about 1 to about 6 carbon atoms.

31. The fluid of claim 2 wherein $R^2$ is selected from the group consisting of hydrogen, vinyl pyrrolidones; vinyl alcohols; piperazines; aminoalkyl piperazines comprising an alkyl group having from about 1 to about 6 carbon atoms; linear, branched and cyclic alkyl, alkenyl, heteroalkyl and heteroalkenyl groups having from about 1 to about 6 carbon atoms, wherein said heteroalkyl or heteroalkenyl groups comprise one or more heteroatom selected from the group consisting of nitrogen and oxygen; aromatic groups comprising an alkenyl substitutent having from about 1 to about 6 carbon atoms; alkoxylated alkyl groups and alkenyl groups having from about 1 to about 6 carbon atoms; acrylonitrile groups; acrylate and methacrylate groups; alkanolamides and alkenolamides having from about 1 to about 6 carbon atoms.

32. The fluid of claim 3 wherein $R^2$ is selected from the group consisting of hydrogen, vinyl pyrrolidones; vinyl alcohols; piperazines; aminoalkyl piperazines comprising an alkyl group having from about 1 to about 6 carbon atoms; linear, branched and cyclic alkyl, alkenyl, heteroalkyl and heteroalkenyl groups having from about 1 to about 6 carbon atoms, wherein said heteroalkyl or heteroalkenyl groups comprise one or more heteroatom selected from the group consisting of nitrogen and oxygen; aromatic groups comprising an alkenyl substitutent having from about 1 to about 6 carbon atoms; alkoxylated alkyl groups arid alkenyl groups having from about 1 to about 6 carbon atoms; acrylonitrile groups; acrylate and methacrylate groups; alkanolamides and alkenolamides having from about 1 to about 6 carbon atoms.

33. The fluid of claim 13 wherein $R^2$ is selected from the group consisting of vinyl pyrrolidone; vinyl alcohol; piperazine; aminoethyl piperazine; styrene; alkyl groups and alkenyl groups having from about 1 to about 6 carbon atoms; trimethyl aminoethyl groups; alkoxylated alkyl groups and alkenyl groups having from about 1 to about 6 carbon atoms; alkenyl alcohols having from about 1 to about 6 carbon atoms; piperazines; styrene; alkoxylated alkyl groups and alkenyl groups having from about 1 to about 6 carbon atoms; acrylonitrile groups; acrylate and methacrylate groups; alkanolamides having from about 1 to about 6 carbon atoms; and vinyl amide.

34. The fluid of claim 2 wherein $R^1$ is selected from the group consisting of vinyl pyrrolidone; vinyl alcohol; piperazine; aminoethyl piperazine; styrene; alkyl groups and alkenyl groups having from about 1 to about 6 carbon atoms; trimethyl aminoethyl groups; alkoxylated alkyl groups and alkenyl groups having from about to about 6 carbon atoms; alkenyl alcohols having from about 1 to about 6 carbon atoms; piperazines; styrene alkoxylated alkyl groups and alkenyl groups having from about 1 to about 6 carbon atoms; acrylonitrile groups; acrylate and methacrylate groups; alkanolamides having from about 1 to about 6 carbon atoms; and vinyl amide.

35. The fluid of claim 3 wherein $R^2$ is selected from the group consisting of vinyl pyrrolidone; vinyl alcohol; piperazine; aminoethyl piperazine; styrene; alkyl groups and alkenyl groups having from about 1 to about 6 carbon atoms; trimethyl aminoethyl groups; alkoxylated alkyl groups and alkenyl groups having from about 1 to about 6 carbon atoms; alkenyl alcohols having from about 1 to about 6 carbon atoms; piperazines; styrene; alkoxylated alkyl groups arid alkenyl groups having from about 1 to about 6 carbon atoms; acrylonitrile groups; acrylate and methacrylate groups; alkanolamides having from about 1 to about 6 carbon atoms; and vinyl amide.

36. The fluid of claim 4 wherein $R^2$ is selected from the group consisting of vinyl pyrrolidone; vinyl alcohol; piperazine; aminoethyl piperazine; styrene; alkyl groups arid alkenyl groups having from about 1 to about 6 carbon atoms; trimethyl aminoethyl groups; alkoxylated alkyl groups and alkenyl groups having from about 1 to about 6 carbon atoms; alkenyl alcohols having from about 1 to about 6 carbon atoms; piperazines; styrene; alkoxylated alkyl groups and alkenyl groups having from about 1 to about 6 carbon atoms; acrylonitrile groups; acrylate and methacrylate groups; alkanolamides having from about 1 to about 6 carbon atoms; and vinyl amide.

37. The fluid of claim 5 wherein $R^2$ is selected from the group consisting of vinyl pyrrolidone; vinyl alcohol; piperazine; aminoethyl piperazine; styrene; alkyl groups and alkenyl groups having from about 1 to about 6 carbon atoms; trimethyl aminoethyl groups; alkoxylated alkyl groups and alkenyl groups having from about 1 to about 6 carbon atoms; alkenyl alcohols having from about 1 to about 6 carbon atoms; piperazines; styrene; alkoxylated alkyl groups and alkenyl groups having from about 1 to about 6 carbon atoms; acrylonitrile groups; acrylate and methacrylate groups; alkanolamides having from about 1 to about 6 carbon atoms; and vinyl amide.

38. A drilling system fluid comprising:
water as a continuous phase;
a first amount of a multivalent metal salt;
a second amount of a monovalent salt, said second amount being sufficient to increase gas hydrate suppression and decrease density when compared to said fluid consisting essentially of said multivalent salt in the absence of said monovalent salt;
a quantity of water soluble polyacrylamide copolymer having a cationic charge density of at least about 1% and having the following general structure:

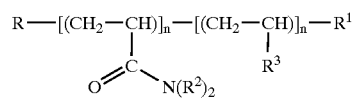

wherein
R and $R^1$ independently are selected from the group consisting of hydrogen, acrylamide groups, acrylate groups, polyacrylamide groups, and polyacrylate groups, and copolymers thereof;
$R^2$ is selected from the group consisting of vinyl pyrrolidone; vinyl alcohol; piperazine; aminoethyl piperazine;

styrene; alkyl groups and alkenyl groups having from about 1 to about 6 carbon atoms; trimethyl aminoethyl groups; alkoxylated alkyl groups and alkenyl groups having from about 1 to about 6 carbon atoms; alkenyl alcohols having from about 1 to about 6 carbon atoms; piperazines; styrene; alkoxylated alkyl groups and alkenyl groups having from about 1 to about 6 carbon atoms; acrylonitrile groups; acrylate and methacrylate groups; alkanolamides having from about 1 to about 6 carbon atoms; and vinyl amide;

$R^3$ is selected from groups comprising a charge in the range of from about +1 to about +4; and n independently is at least 1.

39. The fluid of claim 14 wherein $R^2$ is selected from the group consisting of vinyl pyrrolidone; vinyl alcohol; piperazine; aminoethyl piperazine; styrene; alkyl groups and alkenyl groups having from about 1 to about 6 carbon atoms; trimethyl aminoethyl groups; alkoxylated alkyl groups and alkenyl groups having from about 1 to about 6 carbon atoms; alkenyl alcohols having from about 1 to about 6 carbon atoms; piperazines; styrene; alkoxylated alkyl groups and alkenyl groups having from about 1 to about 6 carbon atoms; acrylonitrile groups; acrylate and methacrylate groups; alkanolamides having from about 1 to about 6 carbon atoms; and vinyl amide.

40. The fluid of claim 6 wherein $R^2$ is selected from the group consisting of vinyl pyrrolidone; vinyl alcohol; piperazine; aminoethyl piperazine; styrene; alkyl groups and alkenyl groups having from about 1 to about 6 carbon atoms; trimethyl aminoethyl groups; alkoxylated alkyl groups and alkenyl groups having from about 1 to about 6 carbon atoms; alkenyl alcohols having from about 1 to about 6 carbon atoms; piperazines; styrene; alkoxylated alkyl groups and alkenyl groups having from about 1 to about 6 carbon atoms; acrylonitrile groups; acrylate and methacrylate groups; alkanolamides having from about 1 to about 6 carbon atoms; and vinyl amide.

41. The drilling system fluid of claim 1 wherein at least a portion of $R^3$ have the following general structure:

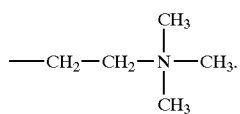

42. A drilling system fluid comprising:
water as a continuous phase;
a first amount of a multivalent metal salt
a second amount of a monovalent salt, said second amount being sufficient to increase gas hydrate suppression and decrease density when compared to said fluid consisting essentially of said multivalent salt in the absence of said monovalent salt; and,
a quantity of water soluble polyacrylamide copolymer having a cationic charge density of at least about 1% and having the following general structure:

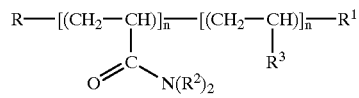

wherein R and $R^1$ independently are selected from the group consisting of hydrogen, acrylamide groups, acrylate groups, polyacrylamide groups, and polyacrylate groups, and copolymers thereof;

$R^2$ independently is selected from moieties selected from the group consisting of vinyl pyrrolidone; vinyl alcohol; piperazine; aminoethyl piperazine; styrene; alkyl groups and alkenyl groups having from about to about 6 carbon atoms; trimethyl aminoethyl groups; alkoxylated alkyl groups and alkenyl groups having from about 1 to about 6 carbon atoms; alkenyl alcohols having from about 1 to about 6 carbon atoms; piperazines; styrene; alkoxylated alkyl groups and alkenyl groups having from about 1 to about 6 carbon atoms; acrylonitrile groups; acrylate and methacrylate groups; alkanolamides having from about 1 to about 6 carbon atoms; and vinyl amide;

$R^3$ comprises a charge of from about +1 to about +4 and is selected from the group consisting of ester groups; hydrogen; cyclic, linear, and branched alkyl and heteroalkyl groups having from about 1 to about 6 carbon atoms wherein said heteroalkyl groups comprise one or more heteroatoms selected from the group consisting of nitrogen and oxygen; cyclic, linear, and branched alkenyl and heteroalkenyl groups having from about 1 to about 6 carbon atoms and resonance hybrids thereof; carboxylic acid groups and salts, esters, and amides thereof comprising cyclic, linear, and branched alkyl groups, heteroalkyl groups, alkenyl groups, and heteroalkenyl groups having from about 1 to about 6 carbon atoms wherein said hetero groups comprise one or more heteroatoms selected from the group consisting of nitrogen and oxygen; aromatic groups; alkanols and alkenols having from about 1 to about 6 carbon atoms; alkanolamides and alkenol amides; and n independently is at least 1.

43. The fluid of claim 42 wherein said cationic charge density is from about 1% to about 15%.

44. The fluid of claim 42 wherein said cationic charge density is from about 5% to about 10%.

45. The fluid of claim 42 wherein said multivalent metal salt is a divalent metal salt.

46. The fluid of claim 42 wherein said multivalent metal salt comprises a calcium metal salt.

47. The fluid of claim 44 wherein said multivalent salt is calcium chloride and said monovalent salt is sodium chloride.

48. The fluid of claim 47 wherein said calcium chloride is from about 5 wt % to about 20 wt %, and said sodium chloride is about 40 lb/bbl to about 70 lb/bbl.

49. The fluid of claim 42 wherein said polyacrylamide copolymer has a molecular weight of from about 800,000 to about 1 million mole weight.

50. The fluid of claim 43 wherein said polyacrylamide copolymer has a molecular weight of from about 800,000 to about 1 million mole weight.

51. The fluid of claim wherein said polyacrylamide copolymer has a molecular weight of from about 800,000 to about 1 million mole weight.

52. The fluid of claim 45 wherein said polyacrylamide copolymer has a molecular weight of from about 800,000 to about 1 million mole weight.

53. The fluid of claim 46 wherein said polyacrylamide copolymer has a molecular weight of from about 800,000 to about 1 million mole weight.

54. The fluid of claim 48 wherein said polyacrylamide copolymer has a molecular weight of from about 800,000 to about 1 million mole weight.

55. The fluid of claim 47 wherein said polyacrylamide copolymer has a molecular weight of from about 800,000 to about 1 million mole weight.

56. The fluid of claim 42 wherein $R^3$ is selected from the group consisting of ester groups; alkenyl pyrrolidones; alkenols; piperazines; styrenes; cyclic, linear, and branched alkyl, alkenyl, heteroalkyl, and heteroalkenyl groups having from about 1 to about 6 carbon atoms, wherein said heteroalkyl or heteroalkenyl groups comprise one or more heteroatom selected from the group consisting of nitrogen and oxygen; alkoxylated alkenyl groups having from about 1 to about 6 carbon atoms; acrylonitriles; acrylate groups; methacrylate groups; alkanolamides having from about 1 to about 6 carbon atoms; and alkenyl amides having from about 1 to about 6 carbon atoms.

57. The fluid of claim 43 wherein $R^3$ is selected from the group consisting of ester groups; alkenyl pyrrolidones; alkenols; piperazines; styrenes; cyclic, linear, and branched alkyl, alkenyl, heteroalkyl, and heteroalkenyl groups having from about 1 to about 6 carbon atoms, wherein said heteroalkyl or heteroalkenyl groups comprise one or more heteroatom selected from the group consisting of nitrogen and oxygen; alkoxylated alkenyl groups having from about 1 to about 6 carbon atoms; acrylonitriles; acrylate groups; methacrylate groups; alkanolamides having from about 1 to about 6 carbon atoms; and alkenyl amides having from about 1 to about 6 carbon atoms.

58. The fluid of claim 44 wherein $R^3$ is selected from the group consisting of ester groups; alkenyl pyrrolidones; alkenols; piperazines; styrenes; cyclic, linear, and branched alkyl, alkenyl, heteroalkyl, and heteroalkenyl groups having from about 1 to about 6 carbon atoms, wherein said heteroalkyl or heteroalkenyl groups comprise one or more heteroatom selected from the group consisting of nitrogen and oxygen; alkoxylated alkenyl groups having from about 1 to about 6 carbon atoms; acrylonitriles; acrylate groups; methacrylate groups; alkanolamides having from about 1 to about 6 carbon atoms; and alkenyl amides having from about 1 to about 6 carbon atoms.

59. The fluid of claim 42 wherein $R^3$ is selected from the group consisting of ester groups; vinyl pyrrolidones; vinyl alcohols; piperazines; aminoalkyl piperazines comprising art alkyl group having from about 1 to about 6 carbon atoms; linear, branched and cyclic alkyl, alkenyl, heteroalkyl and heteroalkenyl groups having from about 1 to about 6 carbon atoms, wherein said heteroalkyl or heteroalkenyl groups comprise one or more heteroatom selected from the group consisting of nitrogen and oxygen; aromatic groups comprising an alkenyl substitutent having from about 1 to about 6 carbon atoms; alkoxylated alkyl groups and alkenyl groups having from about 1 to about 6 carbon atoms; acrylonitrile groups; acrylate and methacrylate groups; alkanolamides and alkenolamides having from about 1 to about 6 carbon atoms.

60. The fluid of claim 43 wherein $R^3$ is selected from the group consisting of ester groups; vinyl pyrrolidones; vinyl alcohols; piperazines; aminoalkyl piperazines comprising an alkyl group having from about 1 to about 6 carbon atoms; linear, branched and cyclic alkyl, alkenyl, heteroalkyl and heteroalkenyl groups having from about 1 to about 6 carbon atoms, wherein said heteroalkyl or heteroalkenyl groups comprise one or more heteroatom selected from the group consisting of nitrogen and oxygen; aromatic groups comprising an alkenyl substitutent having from about 1 to about 6 carbon atoms; alkoxylated alkyl groups and alkenyl groups having from about 1 to about 6 carbon atoms; acrylonitrile groups; acrylate and methacrylate groups; alkanolamides and alkenolamides having from about 1 to about 6 carbon atoms.

61. The fluid of claim 44 wherein $R^3$ is selected from the group consisting of ester groups; vinyl pyrrolidones; vinyl alcohols; piperazines; aminoalkyl piperazines comprising an alkyl group having from about 1 to about 6 carbon atoms; linear, branched and cyclic alkyl, alkenyl, heteroalkyl and heteroalkenyl groups having from about 1 to about 6 carbon atoms, wherein said heteroalkyl or heteroalkenyl groups comprise one or more heteroatom selected from the group consisting of nitrogen and oxygen; aromatic groups comprising an alkenyl substitutent having from about 1 to about 6 carbon atoms; alkoxylated alkyl groups and alkenyl groups having from about 1 to about 6 carbon atoms; acrylonitrile groups; acrylate and methacrylate groups; alkanolamides and alkenolamides having from about 1 to about 6 carbon atoms.

62. The fluid of claim 42 wherein $R^3$ is selected from the group consisting of ester groups; vinyl pyrrolidone; vinyl alcohol; piperazine; aminoethyl piperazine; styrene; alkyl groups and alkenyl groups having from about 1 to about 6 carbon atoms; trimethyl aminoethyl groups; alkoxylated alkyl groups and alkenyl groups having from about 1 to about 6 carbon atoms; alkenyl alcohols having from about 1 to about 6 carbon atoms; piperazines; styrene; alkyl groups having from about 1 to about 6 carbon atoms; alkoxylated alkyl groups and alkenyl groups having from about 1 to about 6 carbon atoms; acrylonitrile groups; acrylate and methacrylate groups; alkanolamides having from about 1 to about 6 carbon atoms; and vinyl amide.

63. The fluid of claim 43 wherein $R^3$ is selected from the group consisting of ester groups; vinyl pyrrolidone; vinyl alcohol; piperazine; aminoethyl piperazine; styrene; alkyl groups and alkenyl groups having from about 1 to about 6 carbon atoms; trimethyl aminoethyl groups; alkoxylated alkyl groups and alkenyl groups having from about 1 to about 6 carbon atoms; alkenyl alcohols having from about 1 to about 6 carbon atoms; piperazines; styrene; alkyl groups having from about 1 to about 6 carbon atoms; alkoxylated alkyl groups and alkenyl groups having from about 1 to about 6 carbon atoms; acrylonitrile groups; acrylate and methacrylate groups; alkanolamides having from about 1 to about 6 carbon atoms; and vinyl amide.

64. The fluid of claim 44 wherein $R^3$ is selected from the group consisting of ester groups; vinyl pyrrolidone; vinyl alcohol; piperazine; aminoethyl piperazine; styrene; alkyl groups and alkenyl groups having from about 1 to about 6 carbon atoms; trimethyl aminoethyl groups; alkoxylated alkyl groups and alkenyl groups having from about 1 to about 6 carbon atoms; alkenyl alcohols having from about 1 to about 6 carbon atoms; piperazines; styrene; alkyl groups having from about 1 to about 6 carbon atoms; alkoxylated alkyl groups and alkenyl groups having from about 1 to about 6 carbon atoms; acrylonitrile groups; acrylate and methacrylate groups; alkanolamides having from about 1 to about 6 carbon atoms; and vinyl amide.

65. The fluid of claim 44 wherein $R^3$ is selected from the group consisting of ester groups; vinyl pyrrolidone; vinyl alcohol; piperazine; aminoethyl piperazine; styrene; alkyl groups and alkenyl groups having from about 1 to about 6 carbon atoms; trimethyl aminoethyl groups; alkoxylated alkyl groups and alkenyl groups having from about 1 to about 6 carbon atoms; alkenyl alcohols having from about 1 to about 6 carbon atoms; piperazines; styrene; alkyl groups having from about 1 to about 6 carbon atoms; alkoxylated alkyl groups and alkenyl groups having from about 1 to about 6 carbon atoms; acrylonitrile groups; acrylate and methacrylate groups; alkanolamides having from about 1 to about 6 carbon atoms; and vinyl amide.

66. The fluid of claim 45 wherein $R^3$ is selected from the group consisting of ester groups; vinyl pyrrolidone; vinyl alcohol; piperazine; aminoethyl piperazine; styrene; alkyl groups and alkenyl groups having from about 1 to about 6 carbon atoms; trimethyl aminoethyl groups; alkoxylated alkyl groups and alkenyl groups having from about 1 to about 6 carbon atoms; alkenyl alcohols having from about 1 to about 6 carbon atoms; piperazines; styrene; alkyl groups having from about 1 to about 6 carbon atoms; alkoxylated alkyl groups and alkenyl groups having from about 1 to about 6 carbon atoms; acrylonitrile groups; acrylate and methacrylate groups; alkanolamides having from about 1 to about 6 carbon atoms; and vinyl amide.

67. The fluid of claim 46 wherein $R^3$ is selected from the group consisting of ester groups; vinyl pyrrolidone; vinyl alcohol; piperazine; aminoethyl piperazine; styrene; alkyl groups and alkenyl groups having from about 1 to about 6 carbon atoms; trimethyl aminoethyl groups; alkoxylated alkyl groups and alkenyl groups having from about 1 to about 6 carbon atoms; alkenyl alcohols having from about 1 to about 6 carbon atoms; piperazines; styrene; alkyl groups having from about 1 to about 6 carbon atoms; alkoxylated alkyl groups and alkenyl groups having from about 1 to about 6 carbon atoms; acrylonitrile groups; acrylate and methacrylate groups; alkanolamides having from about 1 to about 6 carbon atoms; and vinyl amide.

68. The fluid of claim 47 wherein $R^3$ is selected from the group consisting of ester groups; vinyl pyrrolidone; vinyl alcohol; piperazine; aminoethyl piperazine; styrene; alkyl groups and alkenyl groups having from about 1 to about 6 carbon atoms; trimethyl aminoethyl groups; alkoxylated alkyl groups and alkenyl groups having from about 1 to about 6 carbon atoms; alkenyl alcohols having from about 1 to about 6 carbon atoms; piperazines; styrene; alkyl groups having from about 1 to about 6 carbon atoms; alkoxylated alkyl groups and alkenyl groups having from about 1 to about 6 carbon atoms; acrylonitrile groups; acrylate and methacrylate groups; alkanolamides having from about 1 to about 6 carbon atoms; and vinyl amide.

69. The fluid of claim 48 wherein $R^3$ is selected from the group consisting of ester groups; vinyl pyrrolidone; vinyl alcohol; piperazine; aminoethyl piperazine; styrene; alkyl groups and alkenyl groups having from about 1 to about 6 carbon atoms; trimethyl aminoethyl groups; alkoxylated alkyl groups and alkenyl groups having from about 1 to about 6 carbon atoms; alkenyl alcohols having from about 1 to about 6 carbon atoms; piperazines; styrene; alkyl groups having from about 1 to about 6 carbon atoms; alkoxylated alkyl groups and alkenyl groups having from about 1 to about 6 carbon atoms; acrylonitrile groups; acrylate and methacrylate groups; alkanolamides having from about 1 to about 6 carbon atoms; and vinyl amide.

70. The fluid of claim 42 wherein at least a portion of $R^3$ have the following general structure:

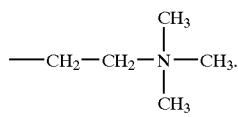

71. The fluid of claim 43 wherein at least a portion of said $R^3$ have the following general structure:

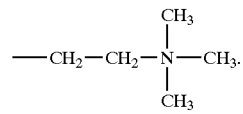

72. The fluid of claim 44 wherein at least a portion of said $R^3$ have the following general structure:

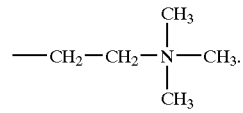

73. The fluid of claim 45 wherein at least a portion of said $R^3$ have the following general structure:

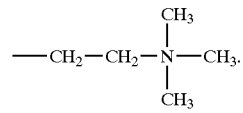

74. The fluid of claim 46 wherein at least a portion of said $R^3$ have the following general structure:

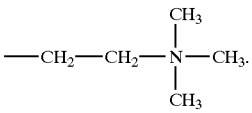

75. The fluid of claim 38 wherein at least a portion of said $R^3$ have the following general structure:

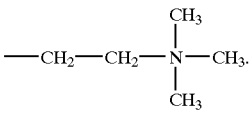

76. The fluid of claim 1 wherein said fluid comprises from about 0.05 wt. % to about 0.5 wt. % of said polyacrylamide copolymer.

77. The fluid of claim 2 wherein said fluid comprises from about 0.05 wt. % to about 0.5 wt. % of said polyacrylamide copolymer.

78. The fluid of claim 3 wherein said fluid comprises from about 0.05 wt. % to about 0.5 wt. % of said polyacrylamide copolymer.

79. The fluid of claim 38 wherein said fluid comprises from about 0.05 wt. % to about 0.5 wt. % of said polyacrylamide copolymer.

80. The fluid of claim 42 wherein said fluid comprises from about 0.05 wt. % to about 0.5 wt. % of said polyacrylamide copolymer.

81. The method of claim 1 wherein said fluid comprises at least about 0.8 wt. % of said polyacrylamide copolymer.

82. The method of claim 2 wherein said fluid comprises at least about 0.8 wt. % of said polyacrylamide copolymer.

83. The method of claim 38 wherein said fluid comprises at least about 0.8 wt. % of said polyacrylamide copolymer.

84. The fluid of claim 42 wherein said fluid comprises at least about 0.8 wt. % of said polyacrylamide copolymer.

85. The fluid of claim 38 wherein said multivalent salt is calcium chloride and said monovalent salt is sodium chloride.

86. The fluid of claim 85, wherein said calcium chloride is from about 5 wt % to about 20 wt %, arid said sodium chloride is about 40 Ib/bbl to about 70 lb/bbl.

87. The fluid of claim 2 wherein said multivalent metal salt is a divalent metal salt.

88. The fluid of claim 2 wherein said multivalent metal salt comprises a calcium metal salt.

89. The fluid of claim 3 wherein said multivalent metal salt is a divalent metal salt.

90. The fluid of claim 3 wherein said multivalent metal salt comprises a calcium metal salt.

91. The fluid of claim 42 wherein said multivalent salt is calcium chloride and said monovalent salt is sodium chloride.

92. The fluid of claim 91, wherein said calcium chloride is from about 5 wt % to about 20 wt %, and said sodium chlorides about 40 lb/bbl to about 70 lb/bbl.

93. The fluid of claim 1 wherein said amount of said multivalent salt and said quantity of polyacrylamide copolymer are effective to prevent substantial screen blinding.

94. The fluid of claim 38 wherein said amount of said multivalent salt and said quantity of polyacrylamide copolymer are effective to prevent substantial screen blinding.

95. The fluid of claim 42 wherein said amount of said multivalent salt and said quantity of polyacrylamide copolymer are effective to prevent substantial screen blinding.

* * * * *